April 13, 1965    F. R. TITTMANN    3,178,328
PROCESS AND APPARATUS FOR PRODUCING PLASTIC NET
Filed May 17, 1961    3 Sheets-Sheet 1

INVENTOR.
FREDERICK R. TITTMANN
BY
ATTORNEY

April 13, 1965 F. R. TITTMANN 3,178,328
PROCESS AND APPARATUS FOR PRODUCING PLASTIC NET
Filed May 17, 1961 3 Sheets-Sheet 2

INVENTOR.
FREDERICK R. TITTMANN
BY
ATTORNEY

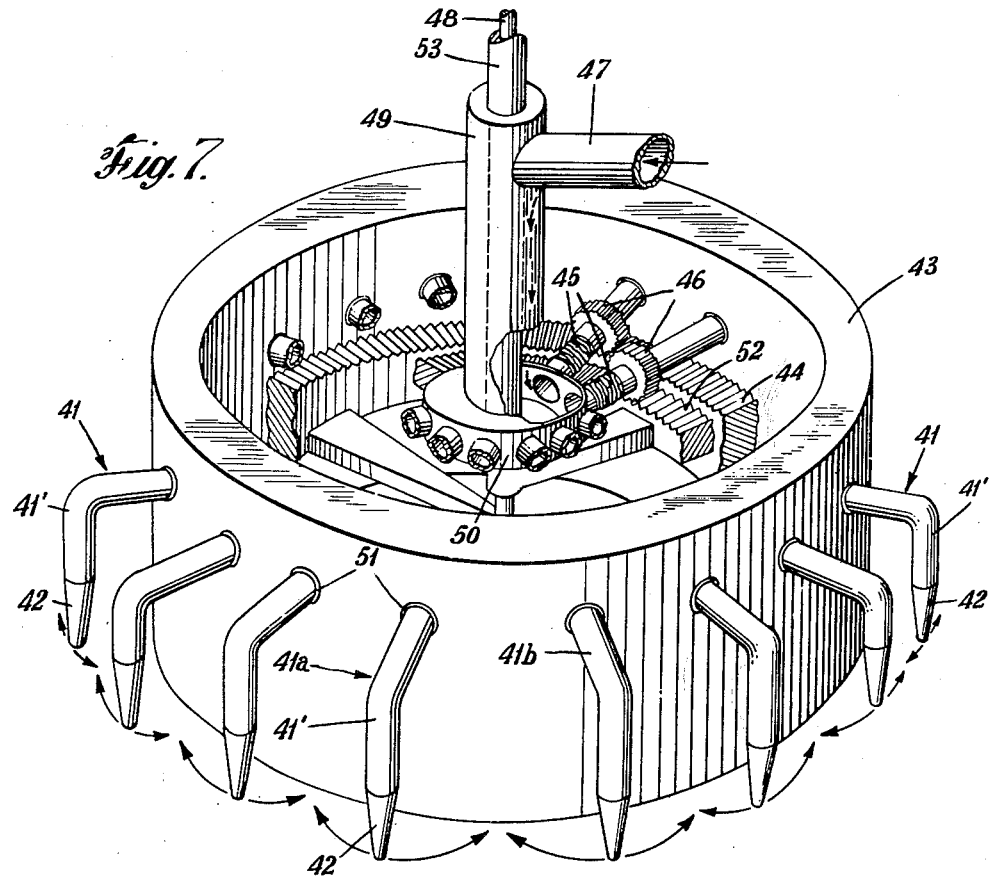
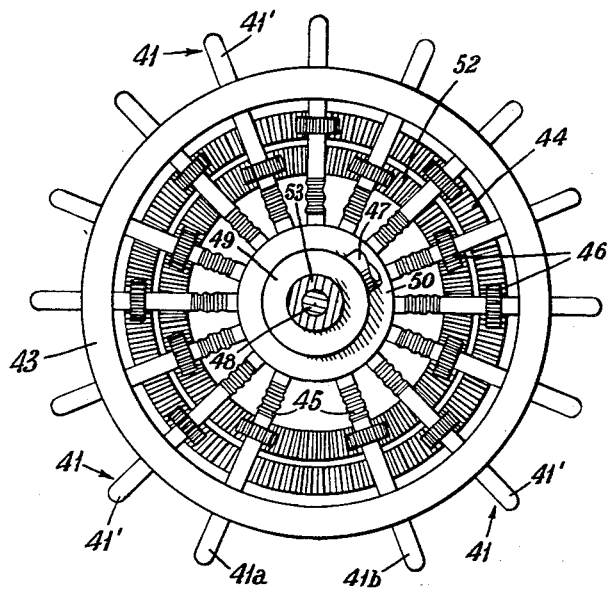

United States Patent Office 3,178,328
Patented Apr. 13, 1965

3,178,328
PROCESS AND APPARATUS FOR PRODUCING
PLASTIC NET
Frederick R. Tittmann, Plainfield, N.J., assignor to Union
Carbide Corporation, a corporation of New York
Filed May 17, 1961, Ser. No. 110,667
10 Claims. (Cl. 156—167)

The present invention relates generally to a process and apparatus for producing plastic net and, more particularly, to a process and apparatus for producing flat plastic net from annular arrangements of extrusion ducts.

Heretofore, both tubular and flat plastic nets have been produced by the extrusion of plastic material from dies which conformed to the final net shape, i.e., tubular net from annular or circular dies and flat net from linear dies. In both types of dies, a uniform distribution of pressure and resin must be maintained over all the extrusion ducts in order to produce strands of uniform thickness. However, in the case of linear dies, it is often difficult to attain the desired uniform distributions over the entire die length; moreover, this difficulty becomes more pronounced as the strand gauge increases. Of course, it is possible to produce flat net by merely slitting the tubular net produced from annular or circular extrusion dies, but such a process requires an additional cutting operation and may cause distortion in the mesh, resulting in curved, unfinished edges on the net.

It is, therefore, the main object of the present invention to provide a process and apparatus for producing flat plastic netting from annular or circular extrusion dies without the use of a longitudinal cutting step.

It is another object of the invention to provide a process and apparatus for producing a flat plastic net with finished edges from annular or circular extrusion dies.

It is a further object of the invention to provide a process and apparatus for producing flat plastic net from circular arrangements of extrusion ducts in a minimum number of steps.

A still further object of the invention is to provide an economical process for producing flat plastic net having uniform strand diameters.

Other aims and advantages of the invention will be apparent from the following description and appended claims.

As used herein, the following terms have the following meanings:

The term "fiber-forming plastic mass" refers to:

(a) A synthetic thermoplastic resin capable of melt extrusion or compression extrusion in a molten state through dies and settable by a cooling medium on issuance from the dies. Suitable thermoplastic materials include polyamides or superpolyamides, such as nylon; polyesters; vinyl polymers such as vinyl acetate polymers, acrylonitrile polymers, vinyl chloride polymers, polyvinyl chloride and copolymers thereof with other ethylenically unsaturated monomers such as vinyl acetate, vinylidine chloride, and like monomers; polyethylene, polypropylene, and like olefin polymers; and polystyrene.

(b) Natural or synthetic rubbers, subsequently vulcanized or containing vulcanized agents.

(c) Those thermosetting plastic materials or mixtures thereof with thermoplastic materials, which are capable of melt extrusion.

(d) Natural and synthetic fiber-forming materials extrudable from solvent solution, such as cuprammonium cellulose or protein material (e.g. from soya bean), cellulose acetate, as well as many thermoplastic resins as mentioned above, dissolved or dispersed in a solvent and capable of extrusion and setting by immersion in or spraying with a coagulant as the plastic mass emerges from the dies.

(e) Foamable compositions containing any of the above materials.

The term "extruded strand-forming streams" refers to the streams of plastic mass formed by the extrusion dies, regardless of whether such streams are within the extrusion dies or outside the extrusion dies.

The term "extrusion duct" refers to that portion of the extrusion apparatus which forms a single strand-forming stream. Each extrusion duct may be a separate nozzle tube or spout, or a plurality of extrusion ducts may be present in a single integral extrusion die. The duct opening may be referred to as a slot, aperture, orifice, vent, etc.

The term "tacky condition" refers to that degree of softness required to cause the adjacent strand-forming streams to fuse or stick together and remain together when the streams are subsequently separated.

The term "amplitude" includes the maximum displacement along a straight or curved path of such elements as a duct, an extrusion die or a strand-forming stream.

In accordance with the present invention, a process and apparatus are provided for producing flat plastic net by extruding a fiber-forming plastic mass into a plurality of plastic strand-forming streams arranged in at least one circle and imparting relative oscillatory movement to the strand-forming streams in a direction transverse to the direction of extrusion so as to periodically contact and separate adjacent strand-forming streams while the plastic mass is in tacky condition, at least one pair of adjacent strand-forming streams in the same circle being spaced apart a distance greater than the amplitude of the relative oscillatory movement.

The extruded strand-forming streams of plastic mass may be arranged in a single circle or in two or more concentric circles. The relative oscillatory movement may be further described as relative rotational oscillatory movement in certain embodiments of the invention. In either case, the space between at least one pair of adjacent strand-forming streams is greater than the amplitude of the relative oscillatory movement of the plastic streams; thus, it is impossible for that pair of adjacent streams to be connected in the resulting net. The result is a continuous longitudinal gap in the otherwise tubular net, thereby producing a flat net from circular arrangements of extrusion ducts without the necessity for a longitudinal slitting operation. Of course, the amplitude of the relative transverse displacement of the strand-forming streams must be great enough to periodically contact and separate the remaining streams. If one pair of adjacent streams in one of the circles are spaced a first predetermined distance apart, and the remaining streams are spaced a second predetermined distance apart less than said first predetermined distance, the relative oscillatory movement imparted to the plastic streams must have an amplitude at least equal to the second predetermined distance, but less than the first predetermined distance. If the amplitude of the relative oscillatory movement is less than the second predetermined distance, none of the plastic streams will contact each other, and no intersections will be produced to form a net. Of course, the strand-forming streams of plastic material must be in a tacky condition, i.e., so soft or molten to adhere to each other and remain together at the points of contact.

Since a longitudinal gap appears wherever the distance between an adjacent pair of extrusion ducts is greater than the relative transverse displacement of adjacent streams, it is obvious that more than one strip of flat net can be produced simultaneously from the same extrusion dies by simply increasing the spacing between more than one pair of adjacent extrusion ducts. Also, when the process is such that concentric circles of strand-forming streams are formed, all the "gap-forming" pairs of ducts need not be located in the same circle.

In the drawings:

FIG. 7 is an isometric view, partly in section, of another form of extrusion apparatus embodying the present invention; and FIG. 8 is a plane view of the apparatus of FIG. 7.

Figure 1:
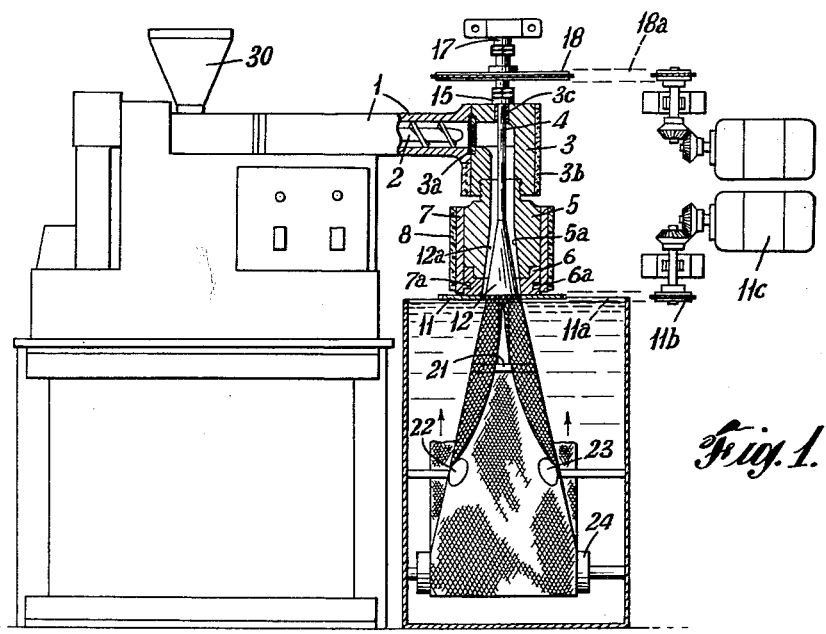
FIG. 1 is an elevational view, partially in section, of a preferred form of extrusion apparatus embodying the present invention and located over a coolant tank and associated with a haul-off mechanism for the extruded net.

Preferred embodiments of the inventive process and apparatus will now be described in detail by referring to the drawings.

Figure 2:
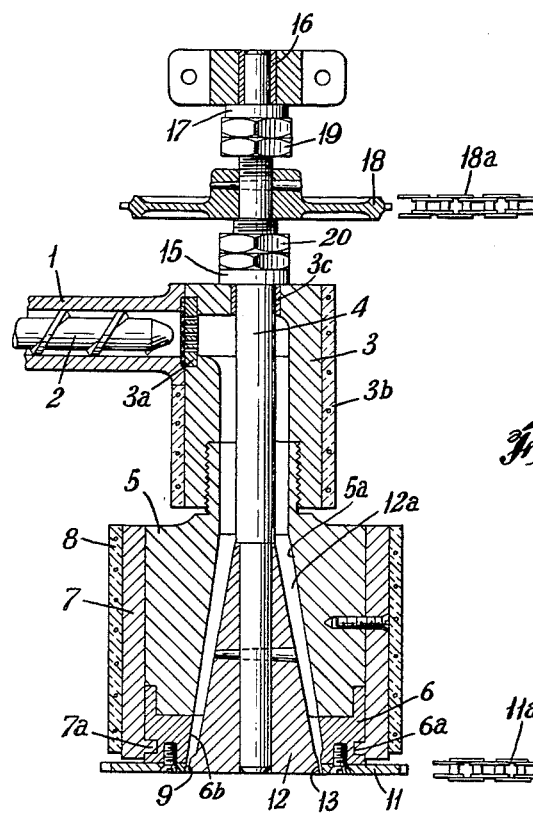
FIG. 2 is a more detailed sectional elevation view of the extrusion apparatus shown in FIG. 1.
Figure 3:
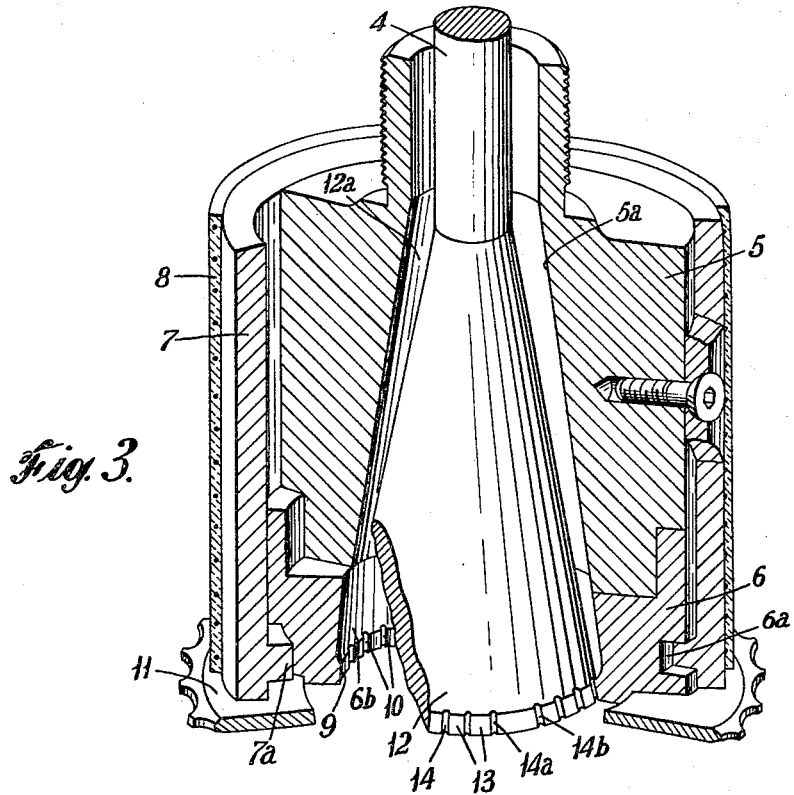
FIG. 3 is a fragmentary perspective view of the apparatus of FIG. 1.

In FIGS. 1 through 3, there is illustrated an apparatus for carrying out the invention in a melt extrusion process in which concentric annular sets of extrusion ducts are employed, and between which continuous relative rotational oscillatory movement takes place transversely to the direction of extrusion of a synthetic thermoplastic resin. The thermoplastic material for extrusion is contained in a hopper 30. From the hopper 30 extends a suitably heated conduit 1, in which a pressure worm 2 is mounted and continuously rotated to maintain a forced feed. The end of the conduit 1 discharges into a feed chamber 3 through a screen and breaker plate indicated at 3a. The chamber is surrounded by an electrically heated jacket 3b or other heating means which maintains the plastic mass delivered by the worm 2 at an appropriate extrusion temperature. The upper end of the chamber 3 has a gland and bearing 3c for a vertical rotatable shaft 4. The lower end of the chamber 3 is coupled to an extrusion chamber 5 by a screwthreaded neck. The two chambers 3 and 5 and conduit 1 are fixedly supported by a frame or base in any convenient manner.

The cavity of the chamber 5 has a conical wall 5a and supports an outer annular die-carrying member 6 in such a manner that the member 6 is capable of rotational oscillation about the axis of the shaft 4. For example, the lower end of the chamber 5 may be shaped to receive an upwardly directed annular flange provided on the die member 6, the externally peripheral wall of which is formed with a race groove 6a. A split cylinder or sleeve 7 is clamped around the chamber 5 and embracing the die member 6, thereby permitting the removal of the die member and replacement by another having a different set of dies.

The cylinder 7 is electrically or otherwise heated by a jacket 8 and has an annular rib or rail 7a located in the groove 6a. The rib and groove serve as a guiding and supporting race for the rotating die member 6. The lower end of the inner peripheral wall 6b terminates in an annular bevelled or coned surface 9 in which a set of spaced extrusion ducts 10 of suitable cross-sectional shape are formed. The die member 6 may be oscillated by any suitable means; for instance, it may have secured to its underside a chain wheel 11, the chain 11a of which is passed around another chain wheel 11b which is driven through gearing from a suitable source of power 11c.

The shaft 4 carries a replaceable inner or core-like die member 12 which co-operates with the outer die member 6. The inner die member is coned, preferably at slightly less steep angle than the conical wall 5a, such that the two conical wallings enclose an annular conical distributing passageway or cavity 12a for the plastic mass. The lower end of the conical member 12 terminates in an annular surface 13 which is coned exactly to accord with the coning of the surface 9 of the die member 6 and the two surfaces are carefully ground to a precise fit to provide relatively displaceable contacting edges or surfaces.

The surface 13 has a set of spaced extrusion ducts 14 therein opposite to the ducts 10 of the surface 9. In order to produce the aforedescribed longitudinal gap in the resulting net, the extrusion ducts 14a and 14b are spaced apart a distance greater than the distance between any other pair of slots in the slideway 13, and greater than the maximum relative transverse displacement of the ducts 10 and 14.

Figure 6:
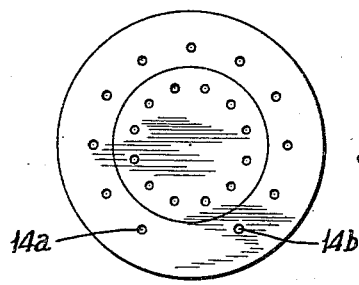
FIG. 6 is a view of the faces of dies having closed extrusion ducts, which can be used in the apparatus shown in FIGS. 1 through 3.

If it is desired to produce more than one strip of flat net from the same apparatus, the spacing between additional pairs of adjacent slots in the surface 9 and/or surface 13 may be increased accordingly. The openings of the extrusion ducts 10 and 14 in the illustrated embodiment are in the form of grooves or slots which are mutually open when traversing each other during rotational oscillation of the die-carrying members 6 and 12, and are cut off from one another when traversing the ground surface of the slideways intervening between the spaced slots. Alternatively, the extrusion ducts 10 and 14 can be set back from the surfaces 9 and 13 such that each duct opening is continuously cut off from the others, as shown in FIG. 6. In such a case, the net would be formed by crossing or contacting the extruded strand-forming streams at the die face or a predetermined distance away from the die face, rather han within the dies.

The shaft 4 is hung on a ball or roller thrust race 15 above the bearing 3c of the feed chamber 3, and the upper extremity of the shaft is steadied in a bearing 16. A second thrust race is provided at 17. Between the two races a chain wheel 18 is pinned to the shaft 4 as a convenient means for imparting rotational oscillation to he shaft 4 and die member 12. The chain 18a may be driven by the same source which drives chain 11a, or by a different source. On each side of the chain wheel 18 the shaft is screw-threaded for pairs of die-setting lock nuts 19 and 20. By the relative adjustment of these nuts, the appropriate sliding engagement is maintained between the contacting edges or surfaces of the surface 9 and 13. Since these surfaces are coned, the mating thereof is substantially perfect and can be so maintained during wear by axial adjustment of the shaft 4.

In operation, the plastic mass is forced by the worm 2 from the pipe 1 in a suitably molten state into the feed chamber 3 and therefrom through the conical annular passageway 12a. As the plastic mass arrives at the upper ends of the two sets of extrusion ducts 10 and 14, it is forced therethrough and is continuously extruded through the lower ends of the orifice of the dies. When the two sets of extrusion ducts traverse one another, confluent streams of the plastic mass issue in common through the paired dies; the common streams are subsequently cut or divided with a shearing action as the ducts 10 and 14 separate and begin to traverse the blank contacting portions of the surfaces 9 and 13 which intervene between the duct openings of each set. During the traversing period of the two sets of ducts, integral intersections of the meshes of the net are produced, while during the nontraversing period each set of dies produces the strands or legs of meshes. The cross-sectional area of the intersections is usually substantially double, or at least greater than, that of the mesh strands.

Figure 4:
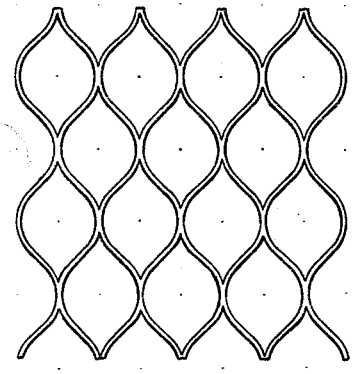
FIGS. 4 and 5 are diagrams of two of the many net patterns capable of being produced by the present invention.
Figure 5:
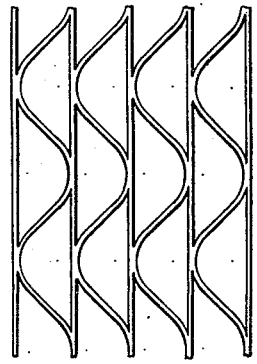

The amplitude of the relative rotational oscillatory movement of the two sets of dies 10 and 14 must be less than the distance between the slots 14a and 14b in order to produce the desired continuous longitudinal gap in the extruded net. For example, when the dies are oscillated in opposite directions, as has been assumed in the above description, the desired effect will be produced if the amplitude of oscillation of each set of ducts is less than half the distance between slots 14a and 14b. The net pattern produced by such a process is illustrated in FIG. 4. Alternatively the relative rotational oscillatory movement of the dies may be effected by oscillating only one of the dies while the other die is stationary, producing the net pattern shown in FIG. 5. As mentioned above, the amplitude of the relative oscillatory movement of the two dies must be large enough to cause the remaining slots in the two dies to periodically come into registration. Obviously, the process and apparatus are susceptible to a variety of modifications in the nature of the relative displacement of the two dies, and in the size and spacing of the duct openings.

The extruded net is usually subjected to a setting or fixing treatment, as by immersing in a cooling liquid immediately below the extrusion dies. Referring to FIG. 1, the aforedescribed extrusion apparatus is mounted over a bath of cooling liquid, which may be water or other liquid appropriate for setting the particular plastic mass being employed. Within the cooling bath or associated therewith, haul-off rolls or equivalent means are provided to take up the net. The extruded net is drawn over a mandrel 21 calculated to ensure an even haul-off and then passed over a pair of spreading devices 22 and 23 and pulled off as flat net over a roller 24 to a suitable collecting means (not shown).

It is of course to be understood that other extrudable fiber-forming plastic materials, such as those heretofore set forth, can be handled in like manner with obvious modifications of the above procedure as will occur to those skilled in the art of such materials.

In FIGS. 7 and 8, there is illustrated an apparatus for carrying out the invention in a melt extrusion process in which a single circle of extrusion ducts or nozzles are employed, and between which continuous relative oscillatory movement takes place transversely to the direction of the extrusion.

The apparatus comprises an annular support 43 having apertures therein in which are inserted bearings 51 and extrusion nozzles 41. In order to produce the longitudinal gap in the extruded net, nozzles 41a and 41b are spaced apart a distance greater than the distance between any other pair of nozzles, and greater than the maximum relative transverse displacement of adjacent nozzles.

Extrusion nozzles 41 are each comprised of a tube 41′, a nozzle tip 42, which is preferably removable, a gear 46, and a bellows section 45. Each of the tubes 41′ is attached to the manifold 50, which is preferably of a rigid nature. Ring gears 44 and 52 rotate reciprocally and in opposite directions so as to impart reciprocating motions to the nozzles 42. This is accomplished by contacting alternate ring gears 46, attached to adjacent nozzles 41, with ring gears 44 and 52. The bellows 45, on each tube, permits partial rotation of the tube while allowing fluid plastic to flow therein. Ring gears 44 and 52 are attached to shafts 48 and 53, respectively, and are rotated in accordance with the rotation of these two shafts. Shaft 53 forms an annulus with the pipe 49, through which the liquid plastic flows to the manifold 50. Liquid plastic flows into the pipe 49 from inlet 47.

By adjusting the timing sequence of the reciprocating movement of the ring gears 44 and 52, a large variety of plastic net patterns can be produced. The plastic mass should be of such a nature that fibers thereof will adhere to each other when they are contacted as the reciprocating nozzles converge. It is preferable that the fibers be not more than about one-quarter inch in diameter. They can be circular, eliptical, or rectangular in cross-sectional shape.

While various specific forms of the present invention have been illustrated and described herein, it is not intended to limit this invention to any of the details herein shown, but only as set forth in the appended claims.

What is claimed is:

1. A process for producing flat plastic net comprising extruding a fiber-forming plastic mass into a plurality of plastic strand-forming streams arranged in at least one circle and imparting relative oscillatory movement to said strand-forming streams in a direction transverse to the direction of extrusion so as to periodically contact and separate adjacent strand-forming streams while said plastic mass is in a tacky condition, at least one pair of adjacent strand-forming streams in the same circle being spaced apart a distance greater than the amplitude of said relative oscillatory movement, and setting the tacky strand-forming streams.

2. A process for producing flat plastic net comprising extruding a fiber-forming plastic mass into a plurality of plastic strand-forming streams arranged in at least two concentric circles and imparting relative rotational oscillatory movement to said circles of strand-forming streams in a direction transverse to the direction of extrusion so as to periodically contact and separate adjacent strand-forming streams while said plastic mass is in a tacky condition, at least one pair of adjacent strand-forming streams in the same circle being spaced apart a distance greater than the amplitude of said relative rotational oscillatory movement, and setting the tacky strand-forming streams.

3. A process for producing flat plastic net comprising extruding a fiber-forming plastic mass into a first set of plastic strand-forming streams arranged in a circle and a second set of plastic strand-forming streams arranged in a circle concentric to the first circle of strand-forming streams, and oscillating at least one of said sets of strand-forming streams in a direction transverse to the direction of extrusion so as to periodically contact and separate said first and second sets of streams while said plastic mass is in a tacky condition, at least one pair of adjacent strand-forming streams in one of said circles being spaced apart a distance greater than the maximum relative transverse displacement of said streams, and setting the tacky strand-forming streams.

4. A process for producing flat plastic net comprising extruding a fiber-forming plastic mass into a first set of plastic strand-forming streams arranged in a circle and a second set of plastic strand-forming streams arranged in a circle concentric to the first circle of strand-forming streams, and imparting relative rotational oscillatory movement to the concentric circles of strand-forming streams in a direction transverse to the direction of extrusion so as to periodically contact and separate said first and second sets of streams while said plastic mass is in a tacky condition, at least one pair of adjacent strand-forming streams in one of said circles being spaced apart a distance greater than the amplitude of said relative rotational oscillatory movement, and setting the tacky strand-forming streams.

5. A process for producing flat plastic net comprising extruding a fiber-forming plastic mass into a plurality of plastic strand-forming streams arranged in a single circle and oscillating said strand-forming streams in a direction transverse to the direction of extrusion so as to periodically contact and separate adjacent strand-forming streams while said plastic mass is in a tacky condition, at least one pair of adjacent strand-forming streams being spaced apart a distance greater than the amplitude of oscillation in said streams, and setting the tacky strand-forming streams.

6. Apparatus for producing flat plastic net comprising a plurality of extrusion ducts arranged in at least one circle, means for supplying said ducts with a fiber-forming plastic mass, and means for imparting relative oscillatory movement to said ducts in a direction traverse to the direction of extrusion whereby adjacent strand-forming streams of plastic mass formed by said ducts are periodically contacted and separated, at least one pair of adjacent ducts in the same circle being spaced apart a distance greater than the amplitude of said relative oscillatory movement, and means for setting said strand-forming streams.

7. Apparatus for producing flat plastic net comprising a first set of extrusion ducts arranged in a circle, a second set of extrusion ducts arranged in a circle concentric to the first circle of ducts, means for supplying said ducts with a fiber-forming plastic mass, and means for imparting relative rotational oscillatory movement to the concentric circles of said ducts in a direction transverse to the direction of extrusion so as to periodically contact the strand-forming streams of plastic mass formed by said first set of ducts with the strand-forming streams formed by said second set of ducts, at least one pair of adjacent ducts in one of said circles being spaced apart a distance greater than the amplitude of said relative rotational oscillary movement, and means for setting said strand-forming streams.

8. Apparatus for producing flat plastic net comprising a plurality of extrusion ducts arranged in at least two concentric circles, means for supplying said ducts with a fiber-forming plastic mass, and means for imparting relative rotational oscillatory movement to said circles of ducts in a direction transverse to the direction of extrusion whereby adjacent strand-forming streams of plastic mass formed by said ducts are periodically contacted and separated, at least one pair of adjacent ducts in the same circle being spaced apart a distance greater than the amplitude of said relative rotational oscillatory movement, and means for setting said strand-forming streams.

9. Apparatus for producing flat plastic net comprising a first set of extrusion ducts arranged in a circle, a second set of extrusion ducts arranged in a circle concentric to the first circle of nozzles, means for supplying said ducts with a fiber-forming plastic mass, and means for oscillating at least one of said sets of ducts in a direction transverse to the direction of extrusion so as to periodically contact the strand-forming streams of plastic mass formed by said first set of ducts with the strand-forming streams formed by said second set of ducts, at least one pair of adjacent ducts in one of said circles being spaced apart a distance greater than the maximum relative transverse displacement of said streams, and means for setting said strand-forming streams.

10. Apparatus for producing flat plastic net comprising a plurality of extrusion ducts arranged in a single circle, means for supplying said ducts with a fiber-forming plastic mass, and means for oscillating said ducts in a direction transverse to the direction of extrusion so as to contact and separate adjacent strand-forming streams of plastic mass formed by said ducts, at least one pair of adjacent ducts being spaced apart a distance greater than the amplitude of oscillation in said ducts, and means for setting said strand-forming streams.

References Cited by the Examiner

UNITED STATES PATENTS

| | | | |
|---|---|---|---|
| 1,133,892 | 3/15 | Swartz | 18—14 |
| 2,919,467 | 1/60 | Mercer | 18—120 |
| 3,019,147 | 1/62 | Nalle | 154—46 |

FOREIGN PATENTS 552,251 11/56 Belgium.

OTHER REFERENCES

Electrical Engineering, Theory and Practice, by Erickson & Bryant, page 107, published by Wiley & Sons, 1952.

EARL M. BERGERT, *Primary Examiner.*

CARL F. KRAFFT, *Examiner.*